United States Patent [19]

Pyne et al.

[11] 4,190,804
[45] Feb. 26, 1980

[54] SIGNAL-CONDITIONING CIRCUITS

[75] Inventors: Clive R. Pyne; Barry L. Welsh, both of Bedford, England

[73] Assignee: National Research Development Corporation, London, England

[21] Appl. No.: 860,776

[22] Filed: Dec. 15, 1977

[30] Foreign Application Priority Data

Dec. 21, 1976 [GB] United Kingdom ............... 53433/76

[51] Int. Cl.² .................... G01K 7/00; G08B 23/00
[52] U.S. Cl. ..................................... 328/3; 307/310; 323/75 N; 324/DIG. 1; 340/599
[58] Field of Search ............................ 328/3, 16, 210; 307/229, 310; 324/DIG. 1; 323/75 N; 340/501, 599; 73/342, 362 H, 6

[56] References Cited

U.S. PATENT DOCUMENTS

| | | | |
|---|---|---|---|
| 3,873,857 | 3/1975 | Farrish | 307/310 |
| 3,986,862 | 10/1976 | Mikonis | 323/75 N |

Primary Examiner—Stanley D. Miller, Jr.
Assistant Examiner—B. P. Davis
Attorney, Agent, or Firm—Cushman, Darby & Cushman

[57] ABSTRACT

A signal-conditioning circuit for use in conjunction with transducers measuring simultaneously steady state and fluctuating parameters, e.g. pressure. The circuit comprises low-pass filtering means, preferably comprising an active filter, for removing the AC component of the transducer output signal representing the fluctuating component of the measured parameter, to produce a DC output signal representing the steady state component of the measured parameter; and subtracting means for subtracting the DC component from the transducer output signal to produce an AC output signal representing the fluctuating component of the measured parameter. The circuit is thus capable of producing simultaneous outputs representing separately the steady state, fluctuating, and combined components of the transducer output signal, with the introduction of little or no phase error.

The invention also extends to a signal-conditioning circuit for use in conjunction with a transducer of the resistance bridge (strain gauge) type, including means responsive to variations in the temperature of the transducer, conveniently sensed by a sense resister arranged to detect variations in the excitation current drawn by the transducer, to vary the magnitude of a DC offset voltage, and the gain applied to the transducer output signal, whereby to compensate for temperature variations in the zero offset and sensitivity respectively of the transducer.

13 Claims, 4 Drawing Figures

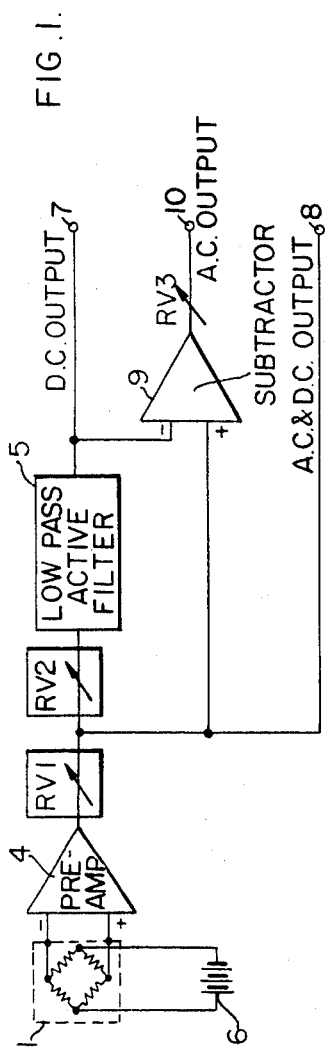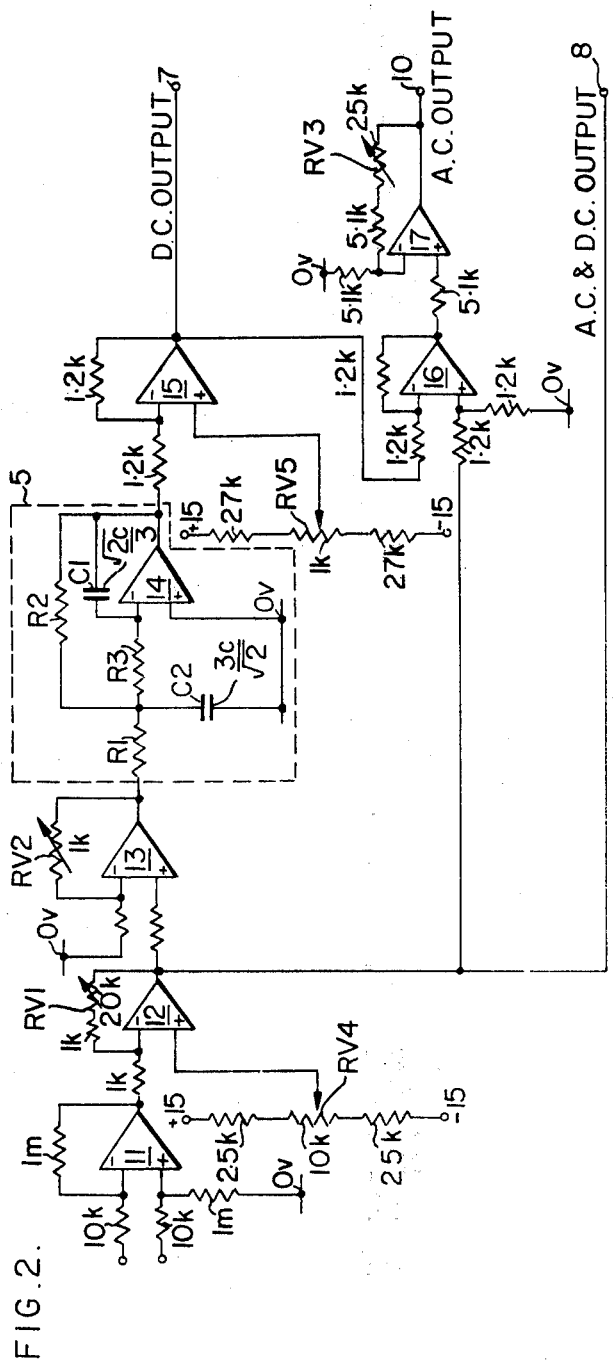

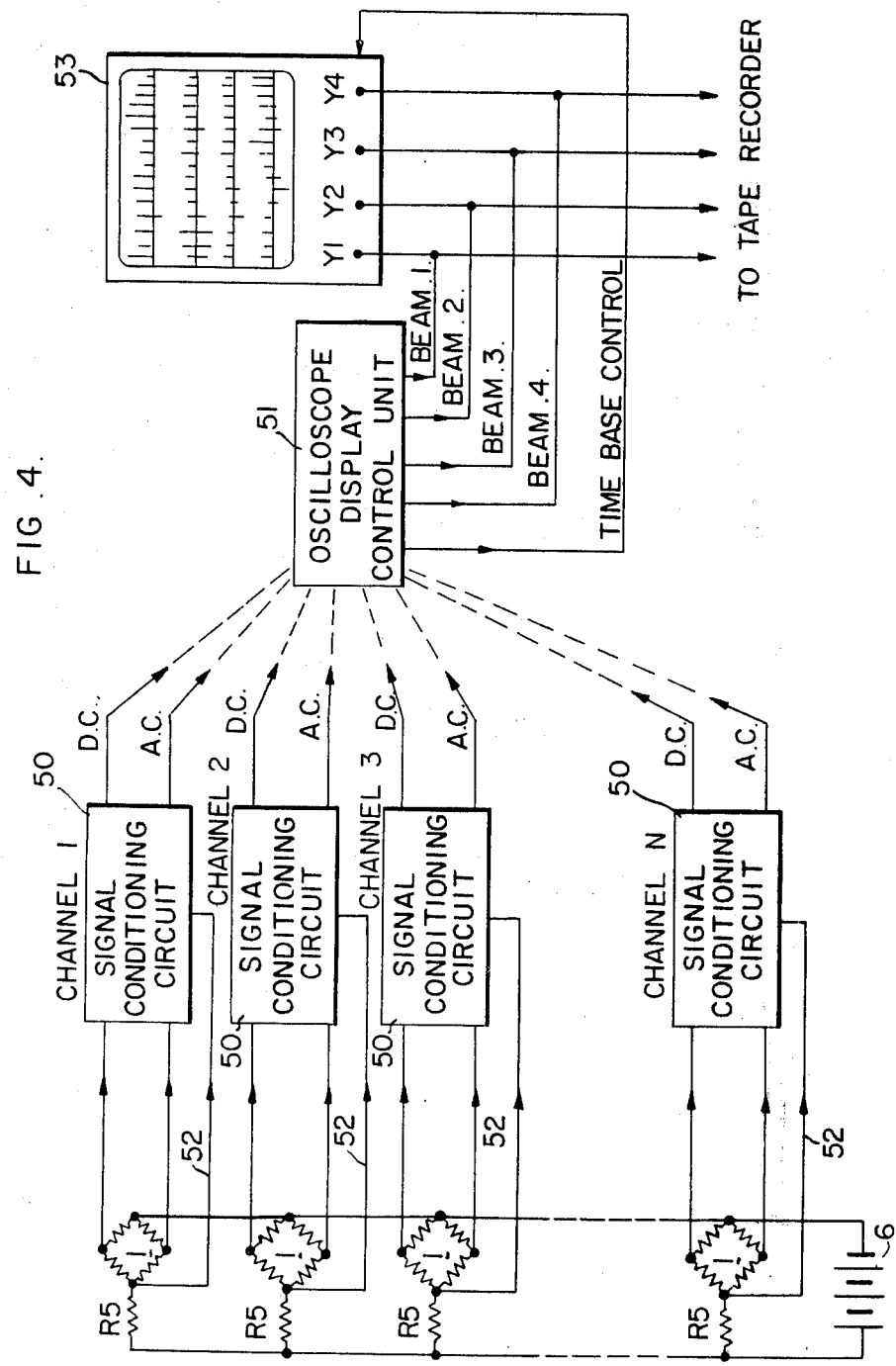

SIGNAL-CONDITIONING CIRCUITS

This invention relates to signal conditioning circuits and particularly though not exclusively, to such circuits as are used in connection with pressure and force transducers.

Pressure transducers of the kind comprising a resistance strain gauge connected in a resistance bridge are commonly used in wind tunnel testing of the aerodynamic properties of test objects, for example aircraft wings. In such applications the pressures occurring at a plurality of different points over the surface of the test object are measured by a plurality of pressure transducers, and the electrical output signals from them are each applied to a separate signal conditioning circuit to provide suitable output signals for display or recording purposes.

In the area of unsteady pressure measurement, in which oscillating movement of the test object in the wind tunnel is induced, the electrical output signals from the pressure transducers have both DC and AC components representing respectively the steady and oscillating components of pressure produced at the various measurements points. In such cases, it is usual to remove the DC component, which is often considerably larger than the AC component, from the transducer output signal for two reasons. Firstly the large DC component would otherwise impose constraints on the amplification of the AC component, tending to overload the amplifier; and secondly to enable separate measurements of the amplitude of the AC component.

In conventional signal conditioning circuits, the DC component of the input signal is removed by passing the transducer output signal through a high-pass filter having a low cut-off frequency which removes the very low frequency components, ie the DC component of the signal, and passes only the AC component, which is then amplified.

However, the disadvantage of this type of signal conditioning circuit is that a phase error is introduced by the filter on the AC component of the signal, which phase error is dependent upon the frequency of the signal. Although this does not affect measurement of the amplitude of the AC component, it does preclude the use of such circuits in applications in which it is required to measure the phase relationship between the oscillating movements of the test object and the oscillating components of the pressure at the various measuring points. It will be apparent that the same principles apply in analogous situations involving measurement of other steady and oscillating physical parameters.

According to a first aspect of the present invention, a signal-conditioning circuit includes low-pass filtering means for producing a DC output signal representing the DC component of an input signal containing both AC and DC components applied to an input terminal of the circuit, and subtracting means arranged to receive said input signal and said DC output signal from the filtering means, and to subtract said DC component from the input signal whereby to provide an output signal representing the AC component of the input signal.

Thus, the AC component of the input signal is separated from the DC component with minimum phase error, since it is not required too pass through a filter. In addition, the DC component of the input signal is also simultaneously available for measurement at the output of the filtering means.

Although passive filtering means may be used it is preferred to use active filtering means to remove the AC component from the input signal since such filters are generally more efficient and have a sharper cut-off characteristic.

The active filtering means may comprise an operational amplifier, preferably in integrated circuit form, together with resistance and capacitance components of suitable value connected in its input and feed back paths and may provide an upper cut-off frequency of approximately 1 Hz. The subtracting means may also comprise an operational amplifier, conveniently in integrated circuit form.

Preferably the circuit includes variable gain-control means for separately controlling the gain applied to the AC and the DC signal components, and may conveniently also include further variable gain-control means for controlling the overall gain applied to the input signal prior to its application to the filtering and subtracting means. Separate gain control of the AC and DC signal components, and of the overall gain of the input signal, is particularly useful for calibration and gain equalisation purposes in multi-channel signal-conditioning system including a plurality of signal-conditioning circuits of the above kind, each arranged to receive simultaneously output signals from a plurality of transducers individually associated with a respective one of the signal conditioning circuit.

In each case, each variable gain-control means preferably comprises an operational amplifier, conveniently in integrated circuit form, with a manually-variable resistance connected in a feed-back path. Manually-adjustable balance-control means may also be provided in the path of the input signal prior to its application to the filtering and subtracting means; and also in the path of the filtered DC component of the signal where active filtering means are used. The provision of such balance-control means, which usually comprises means for controlling an offset voltage applied to an amplifier in the appropriate path, is useful for zeroing purposes, particularly in applications in which the circuit is used for conditioning the signals from resistance bridge transducers.

While such manual gain and balance control of the signal conditioning circuit is adequate for initial calibration, gain equalisation, and zeroing of the associated transducer as outlined above, problems do arise in the case of resistance transducers, particularly semiconductor strain gauge transducers operating on the Wheatstone bridge principal, during subsequent measurements due to variations in the transducer temperature.

Temperature variations affect the performance of this type of transducer in two ways, namely its zero balance, and its sensitivity. In the particular example of pressure measurements in wind tunnels in which considerable variations occur in the temperature of the air flow, the effects of such variations on the performance of the transducers is often overcome by using relatively expensive temperature stable pressure transducers located outside the wind tunnel in a temperature stable environment, and transmitting the measured pressures to them by means of transmission tubes. Such an arrangement is cumbersome and generally compromises the design of the wind tunnel test model used. In addition account must then be taken of the variation in transmission characteristics due to differences in tubing geometry.

According to a second aspect of the invention, a signal-conditioning circuit for use in combination with a transducer of the resistance bridge type, includes means for applying a DC offset voltage to, and for varying the gain applied to the output signal from the transducer in dependence upon variations in the temperature of the transducer, whereby to compensate for variations in the transducer output signal with temperature.

Preferably variations in the temperature of the transducer are detected by sensing variations in the resistance of the transducer. In the case of a transducer excited by a constant voltage supply, this may be achieved by connecting a sense resistor, preferably a temperature-stable resistance, in series with the constant voltage supplied to the transducer and detecting changes in the voltage drop across the sense resistor resulting from temperature variations in the current drawn by the transducer bridge. This voltage is then used in accordance with the invention to control the gain and the DC offset voltage applied to the transducer output signal.

In one embodiment of the invention, the compensation means includes a photo-sensitive resistor connected in series in the path of the transducer output signal, and gain compensation circuitry arranged to apply a gain compensation voltage which varies with the temperature of the transducer to a light emitting device optically coupled to the photo-sensitive resistor. Preferably also, the compensation means includes means for independently varying the gain applied to the DC offset voltage, and the gain applied to a gain compensation voltage for controlling the gain applied to the transducer output signal, whereby to permit manual adjustment of the compensation circuitry for individual transducers. The compensation means may also include means for switching the polarity of the DC offset voltage.

Two signal-conditioning circuits in accordance with the invention, and a multi-channel signal-conditioning system incorporating a plurality of signal-conditioning circuits in accordance with the invention, in their application to the measurement of both steady and unsteady pressures will now be described, by way of example only, with reference to the accompanying drawings of which:

FIG. 1 is a block schematic diagram of a first signal-conditioning circuit in accordance with the invention;

FIG. 2 is a circuit diagram of a signal-conditioning circuit shown in block diagrammatic form in FIG. 1;

FIG. 4 is a block schematic diagram of a multi-channel signal-conditioning system incorporating a plurality of signal-conditioning circuits of the kind shown in FIG. 3.

Figure 3:
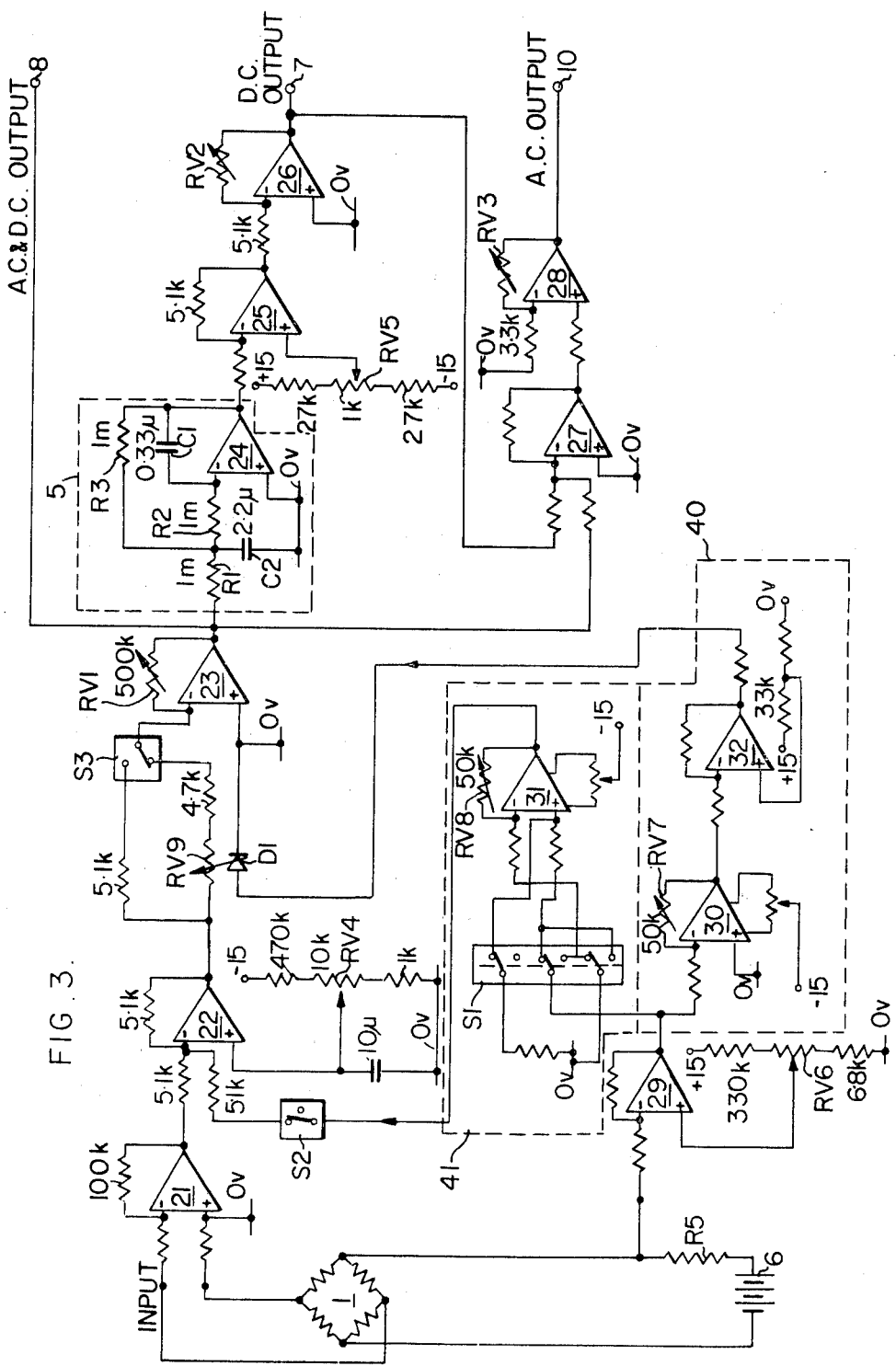
FIG. 3 is a circuit diagram of a second, modified signal-conditioning circuit in accordance with the invention.

Referring to the drawings, FIG. 1 shows in block diagram form, a signal-conditioning circuit for a transducer 1 of known type comprising a four active area Wheatstone bridge of the miniature semiconductor or foil strain gauge type excited from a regulated constant voltage source 6. The transducer 1 may be a pressure transducer suitable for use in the simultaneous measurement of both steady and unsteady pressures within an aerodynamic wind tunnel, so as to produce an output signal containing both DC and AC components representing the steady and unsteady components of pressure respectively. This figure is largely self-explanatory. The output from the transducer 1 containing both AC and DC components is differentially coupled to the input terminals of a pre-amplifier 4 followed by an overall gain control stage RV1. The amplified signal is then fed through a low-pass active filter 5 having a cut-off frequency of approximately 1 Hz, which effectively removes the AC component of the amplified transducer output signal and passes the DC component to a DC output terminal 7. The filter 5 is associated with a presettable gain control stage RV2 by which gain equalisation is provided for the filtered DC component, prior to subtraction from the unfiltered signal. Correct adjustment of this control prevents a DC signal from appearing on the AC output 10.

The output of the filter 5 is also applied to one input of a subtracting amplifier 9, to the other input of which the unfiltered amplified transducer output signal is applied. The subtracting amplifier 9 effectively removes the DC component from the amplified transducer output signal to provide an output representing only the AC component of the signal at a circuit output terminal 10. A gain control stage RV3 is provided between the output of the subtracting amplifier 9 and the output terminal 10 to permit independent gain control of the AC component output signal. The amplified unfiltered transducer output signal is presented at a third circuit output terminal 8.

It will be seen that, because the AC component of the transducer output signal is not required to pass through the filter 5, the phase error produced by the circuit is reduced to a minimum. Furthermore both AC and DC component outputs are conveniently available for simultaneous measurement.

A circuit diagram of actual equipment employed in an embodiment constructed in accordance with the block diagram of FIG. 1 is shown in FIG. 2. The circuit is based on relatively low cost integrated circuit operational amplifiers, and it is envisaged that such a circuit may be constructed in hybrid microcircuit form, using thick film integrated circuit techniques.

Amplifiers 11, 12, provide a two-stage pre-amplifier for the transducer output signal which is differentially coupled to the input terminals of the amplifier 11. Overall variable gain and balance control are provided on amplifier 12 by manually-adjustable potentiometers RV1, RV4 respectively, the balance control being important for transducer zeroing purposes in the measurement of steady pressures represented by the DC component of the transducer output signal.

Presettable gain adjustment of the DC component output is provided for gain equalisation before filtering as described earlier, by a manually adjustable potentiometer RV2 connected in a feedback path of the amplifier 13 to which the output of the amplifier 12 is applied. The output of the amplifier 13 is then applied to the input of the two pole low-pass active filter 5 which is of known form comprising an operational amplifier 14 together with associated RC components R1, R2, R3 and capacitances C1 and C2. The frequency/gain characteristics of the filter 5 are determined by the values of these RC components, and it can be shown that if $R1 = R2 = R3 = R$ ohms, $C1 = \sqrt{2}C/3$ and $C2 = 3C/\sqrt{2}$ Farads, then the gain A of the filter is related by:

$$A = \left( \frac{1}{1 + (\omega RC)^4} \right)^{\frac{1}{2}}$$

where $\omega$ is the angular frequency of the input signal. A 3 dB cut-off frequency of approximately 0.4 Hz, suitable for the present application, can be achieved using values of R = 1 MΩ and C = 1 microfarad. Manually-adjustable potentiometer RV5 is provided on amplifier 15 for pre-settable filter balance control.

The DC component output from amplifier 15 is applied to the DC output terminal 7 of the circuit, and also to the inverting input of subtracting amplifier 16, to the non-inverting input of which the unfiltered amplified output of the amplifier 12 is applied. By subtracting the equalised DC component from the unfiltered signal, the DC component is removed and the amplifier 16 passes only the AC component of the input signal. Separate gain control of this AC output is provided by manually-adjustable potentiometer RV3 connected in the feedback path of amplifier 17, this gain control being provided for increasing the gain of the AC signal if it is significantly smaller than the DC component, and for gain equalisation purposes.

FIG. 3 shows a circuit diagram of a modified form of the signal conditioning circuit of FIG. 2 incorporating, in accordance with the second aspect of the present invention, means for automatically compensating for the effect of temperature variation on the zero balance and sensitivity of the measurement transducer 1.

The circuit of FIG. 3 is essentially similar to the circuit of FIG. 2. Operational amplifiers 21 to 23 provide pre-amplification of the input signal from the transducer 1, which is excited from a regulated constant voltage supply 6. Overall gain and balance control are provided by manually-adjustable potentiometers RV1, RV4 respectively. The filtering stage for removing the AC component of the pre-amplified signal is provided by low-pass active filter 5 incorporating operational amplifier 24, together with operational amplifier 25 and 26 providing presettable filter balance, and presettable DC gain equalisation by means of manually adjustable potentiometers RV5, RV2, respectively. Amplifier 27 is the subtracting amplifier and amplifier 28 provides separate AC gain control by means of manually adjustable potentiometer RV3.

In addition to these components, the FIG. 3 signal conditioning circuit includes a temperature-stable sense resistor R5 connected in series between the regulated voltage supply 6 and the transducer bridge 1. Changes in the temperature of the transducer bridge 1 are reflected by a change in the resistance of the bridge which produces a corresponding change in current in the bridge excitation circuit. However, changes in pressure at a constant temperature do not change the excitation current, so that the sense resistor R5 only senses changes in temperature. This in turn produces a change in voltage drop across the sense resistor R5 which is detected and amplified by the operational amplifier 29 provided with manually-adjustable potentiometer RV6 for balance control.

The output from the amplifier 29 is separately applied to an overall gain compensation circuit 40 for compensating for temperature variations in the sensitivity of the transducer, and an overall offset compensation circuit 41 for compensating for zero drift of the transducer 1 with temperature. The gain compensation circuit 40 includes operational amplifiers 30, 32, amplifier 30 being provided with a manually-adjustable potentiometer RV7 for presettable gain control of the compensating voltage. The compensating output voltage from the amplifier 32 is applied across a photodiode D1 optically coupled to a photo-sensitive gain-control resistor RV9 connected in series in the path of the unfiltered transducer output signal between operational amplifiers 22 and 23 of the pre-amplification stage of the signal conditioning circuit. Thus, by suitable pre-setting adjustment of the gain of the compensation circuit 40 by means of potentiometer RV7, the resistance of the photo-sensitive resistor RV9 can be made to vary so as to control the overall gain in such manner as to compensate for variations in the sensitivity of the transducer.

The offset drift-compensation circuit 41 comprises an operational amplifier 31, with variable gain control provided by manually-adjustable potentiometer RV8, the output voltage of which is applied to the inverting input terminal of the operational amplifier 22 of the overall pre-amplification stage of the signal-conditioning circuit. The polarity of the required offset voltage is selected by a switch S1. Thus by suitable presetting adjustment of the polarity and gain of the offset compensation circuit 41, the zero balance of the transducer is automatically stabilised over a wide range of temperature. The temperature instability characteristics will vary from transducer to transducer, and tests have indicated that, in general, the zero offset and sensitivity of bridge transducers of the semiconductor strain gauge type vary non-linearly with temperature. However, as these characteristics are repeatable for any given temperature, the necessary compensation of both characteristics can be achieved using a linear sense element and a suitably scaled compensating circuitry having a linear response over its operating range. In practice temperature variations in sensitivity and zero balance point of each transducer are monitored over the operating pressure range, and the manually-adjustable potentiometers RV7, RV8 of the compensation circuits 40,41 preset accordingly. Switches S2, S3 are provided for disconnecting the temperature compensation circuits 40,41 when they are not required.

In the particular described application of the invention to wind tunnel pressure measurement, a temperature compensating signal-conditioning circuit in accordance with the second aspect of the invention, provides a number of advantages. It enables accurate measurement of both steady and unsteady pressures using pressure transducers located in-situ on the test model in the wind tunnel under varying temperature air flow, thus obviating the previous requirement to place the transducer outside the wind tunnel. Less temperature-stable transducers which are generally less expensive, can also be used to achieve the same degree of accuracy, without altering or using transducers outside their recommended method of use.

A plurality of transducer signal-conditioning circuits in accordance with the invention may be used in a multi-channel signal-conditioning system for simultaneously displaying and/or recording output signals from a plurality of transducers, for example, pressure transducers used to measure steady and oscillating pressure distributions over the surface of a test model in a wind tunnel Such a system, incorporating a plurality of temperature compensating signal-conditioning circuits 50 of the kind shown in FIG. 3, is shown in schematic block diagram form in FIG. 4.

Each signal-conditioning circuit 50 is differentially coupled to the output of a respective one of a plurality N, of identical resistance bridge pressure transducers 1, all driven from a common regulated constant voltage supply 6, and each associated with a respective sense resistor R5 connected in series with the associated transducer bridge across the supply 6. Variations in the voltage drops across the sense resistors R5 are fed to the respective signal conditioning circuits 50, by means of leads 52.

The transducers are then dynamically calibrated by individually equalising or scaling both the AC and DC gain response of each of the signal-conditioning circuits by appropriate manual adjustment of the gain control potentiometers RV1, and RV3 of each channel at a particular measurement frequency, and also by zero-setting each transducer by appropriate manual adjustment of the balance potentiometer RV4, potentiometers RV2, RV5 and RV6 having been preset.

Relative equalisation between channels of both the AC and the DC components is particularly important in applications in which the different pressures to be measured are transmitted to the transducers by transmission tubing. In such cases, the same equalisation adjustment may not be equally applicable to both steady and unsteady pressure components since the transmission of steady pressures is not affected by differences in tubing geometry. Additionally, separate gain control of the AC component is useful if it is likely to be significantly smaller than the DC component.

The AC and DC component output signals from the signal-conditioning circuits 50 are then fed into an oscilloscope display control unit 51 for providing a simultaneous display of the magnitudes of respective AC and DC components in bar chart form on four-beam cathode ray oscilloscope 53. Provision is also made for displaying the AC plus DC output signals from the signal-condition circuits.

Each beam of the oscilloscope is capable of displaying up to 16 individual signal amplitudes to a preset maximum of 64 on the four-beam tube. Thus the AC and DC outputs from 32 separate transducers may be displayed simultaneously. The oscilloscope display control unit 51 includes an analogue ramp signal generator synchronised to a clock pulse generator producing square waves with a 1:1 mark-to-space ratio. One complete ramp occupies the time of 16 of the clock pulses. The ramp signal is applied to the X-deflection plates of the four beams of the tube, so as to simultaneously sweep all four beams.

The pulses from the clock pulse generator are fed to a programmable binary counter which controls the switching rates of four 16-way multiplexers each of which sequentially switches 16 analogue input lines, which may be the AC or the DC outputs of 16 of the signal conditioning circuits 50, to the Y-deflection plate of a respective beam of the oscilloscope within the ramp signal sweep duration time.

Thus the instantaneous amplitudes of 16 analogue signals may be displayed in bar-chart form by each beam of the tube. Suitable rectification means are switched into each channel whenever AC signals are to be displayed.

The output signal from the signal conditioning circuits 50 may be permanently recorded, and stored for future use, by feeding the output of each multiplexer together with the oscilloscope time-base signal to a standard laboratory FM tape recorder, the signals from the four multiplexers and the time-base signal occupying 5 recorder tracks.

Although the invention has been described in its application to the measurement of pressure using resistance bridge transducers it will be apparent that the invention has much wider applications, and may be used in connection with the measurement of other physical parameters such as force or temperature, or in the processing of any signals containing both AC and DC components where separation of these components is required.

We claim:

1. A signal-conditioning circuit for use in combination with a transducer of the resistance bridge type, including means for receiving an output signal from a transducer of the resistance bridge type, sensor means for sensing variations in the temperature of the transducer, sensitivity compensation means including gain control means in the path of the transducer output signal responsive to the sensor means for controlling the gain applied to the transducer output signal in dependence upon the temperature of the transducer, and offset compensation means responsive to the sensor means to apply to the transducer output signal a DC offset voltage which varies with the temperature of the transducer.

2. A signal-conditioning circuit as claimed in claim 1, and further including input means for receiving a signal containing both AC and DC components, low-pass filtering means for producing a DC output signal representing the DC component of the transducer output signal, and subtracting means arranged to receive the transducer output signal, and said DC output signal from the filtering means, and to subtract the DC output signal from the transducer output signal to produce an AC output signal representing the AC component of the transducer output signal.

3. A signal-conditioning circuit as claimed in claim 1, wherein the low-pass filtering means comprises active filtering means.

4. A signal-conditioning circuit as claimed in claim 3, including manually-adjustable balance control means in the path of the filtered DC component of the transducer output signal.

5. A signal-conditioning circuit as claimed in claim 1, including balance-control means in the path of the transducer output signal prior to its application to the filtering and subtracting means.

6. A signal-conditioning circuit as claimed in claim 1, including variable gain-control means in the path of the transducer output signal prior to its application to the filtering and subtracting means.

7. A signal-conditioning circuit as claimed in claim 1, including variable gain-control means for separately controlling the gain applied to the AC and DC output signals.

8. A signal-conditioning circuit as claimed in claim 1, wherein the sensor means senses variations in the resistance of the transducer.

9. A signal-conditioning circuit as claimed in claim 8, wherein the sensor means comprises a temperature-stable sense-resistance which, in use, is connected in series with the transducer and an excitation current source for the transducer.

10. A signal-conditioning circuit as claimed in claim 9, wherein the sensitivity and offset compensation means each include manually-adjustable gain adjustment means for enabling independent setting of the gain responses thereof.

11. A signal-conditioning circuit as claimed in claim 9, wherein, in use, the DC offset voltage and the gain applied to the transducer output signal both vary linearly with the excitation current drawn by the transducer.

12. A signal conditioning circuit as claimed in claim 8, wherein the gain control means of the sensitivity compensation means comprises a photo-sensitive resistor and a light emitting device optically coupled thereto, the sensitivity compensation means further including circuitry for deriving a sensitivity compensation voltage dependent upon the voltage drop across the sense-resistor and applying it to the light emitting device.

13. A signal-conditioning circuit as claimed in claim 1 including means for switching the polarity of the DC offset voltage.

* * * * *